United States Patent

[15] 3,706,226

[45] Dec. 19, 1972

Kramer

[54] CALORIMETER FOR OBEJCTS OF LOW SOLAR ABSORPTIVITY

[72] Inventor: Otis G. Kramer, Hawthorne, Calif.

[73] Assignee: The United States of America as represented by the Secretary of the Air Force

[22] Filed: May 5, 1971

[21] Appl. No.: 140,400

[52] U.S. Cl. ....73/190 H
[51] Int. Cl. ....G01k 17/00
[58] Field of Search ....73/190, 355; 250/83,3

[56] References Cited

UNITED STATES PATENTS

| | | | |
|---|---|---|---|
| 3,232,113 | 2/1966 | Malone | 73/355 |
| 3,596,514 | 8/1971 | Mefferd et al. | 73/190 |
| 3,075,386 | 1/1963 | Daly | 73/355 |
| 3,280,626 | 10/1966 | Stempel | 73/190 |

OTHER PUBLICATIONS

"An Instrument for the Direct Gardon Measurement of Intense Thermal Radiation" in Review of Scientific Instruments, Vol. 24, No. 5, May 1933 gs 366–70.

*Primary Examiner*—Richard C. Queisser
*Assistant Examiner*—Herbert Goldstein
*Attorney*—Harry A. Herbert, Jr. and Julian L. Siegel

[57] ABSTRACT

A rectangular calorimeter with a copper body except for an upper surface of constantan foil. To the calorimeter's base is attached a thermocouple and a differential thermocouple wire, and to the upper surface is attached a copper center tap wire. A series of these calorimeters is achieved by attaching each center tap wire to the base of an adjacent calorimeter.

1 Claim, 6 Drawing Figures

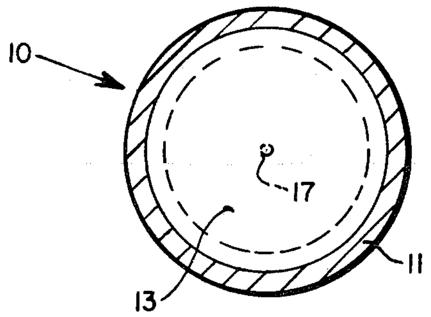
FIG. 1-a
PRIOR ART
FIG. 1-b
PRIOR ART
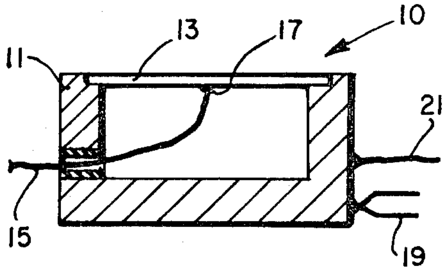
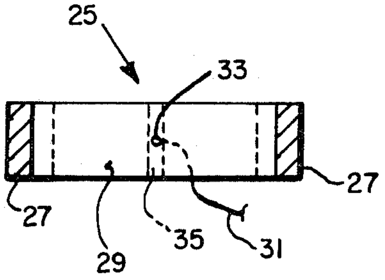
FIG. 2-a
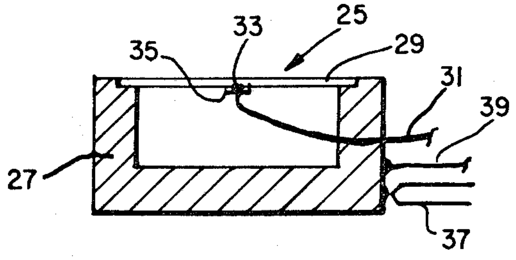
FIG. 2-b
INVENTOR
OTIS G. KRAMER
BY Harry A. Herbert Jr. and
Julian L. Siegel
ATTORNEYS INVENTOR.
OTIS G. KRAMER
BY Harry A. Herbert Jr. and Julian L. Siegel
ATTORNEYS

CALORIMETER FOR OBEJCTS OF LOW SOLAR ABSORPTIVITY

BACKGROUND OF THE INVENTION

There is a need for a calorimeter for testing a satellite or spacecraft with low solar absorptivity thermal control finishes, such as white paint, in a space chamber thermal radiation environment consisting of simulated solar radiation from a solar simulator and simulated albedo and earthshine radiation from an infrared heating array. In order to measure the absorbed radiation under simultaneous exposure to the two radiation sources, the sensing surface of the measuring calorimeter must also be coated with the same thermal control finish. As a consequence of the low solar absorptivity, the calorimeter absorbed radiation flux under full solar irradiation is reduced to the product of the solar absorptivity times the solar constant. That is, $$\dot{q}_a = \alpha_a G_s$$

where $\dot{q}_a$ = absorbed radiation flux, Btu/Ft$^2$ Hr $\alpha_s$ = solar absorptivity, dimensionless $G_s$ = solar constant 442, Btu/Ft$^2$r . For white paint, with a solar absorptivity of 0.23, $$\dot{q}_a = 0.23\ (442)\ \text{Btu/Ft}^2\ \text{Hr} = 102\ \text{Btu/Ft}_2\ \text{Hr}.$$

Commercially available units are nominally intended for use in a single radiation source environment with a black surface finish having a solar absorptivity of 0.85. The full range absorbed solar flux under full solar irradiation is 376 Btu/Ft$^2$ Hr. These units have a tolerance of $\pm 1$ percent of full scale or approximately $\pm 4$ Btu/Ft$^2$ Hr. When these units are used with a low solar absorptivity surface finish, the absorbed radiation flux levels are reduced but the tolerance remains at the $\pm 4$ Btu/Ft$^2$ Hr level. As a consequence, under conditions of only partial solar irradiation the tolerance becomes a significant portion of the measured radiation and the accuracy of the test data becomes questionable.

The advantages of the calorimeter described in this disclosure are as follows:

The calorimeter of the present invention overcomes the above disadvantages because the units are rectangular in construction and can be easily grouped together in series to give a higher signal level under low radiation flux level applications or with a low solar absorptivity finish. The rectangular shape eliminates the radial heat conduction path that may contribute, along with a thick paint coat, to the nonlinearity exhibited by some circular calorimeters. Since the units can be grouped together in series, a reduced output signal from each unit is permissible. This will permit the use of a thicker foil, minimizing the effect of conduction in the paint coating. The construction permits visual inspection up until the units are bonded together for potting and the units are easier to construct than the circular calorimeters.

SUMMARY OF THE INVENTION

The calorimeter presented in this invention has a base of copper, a sensing surface foil of constantan, and a sensing surface tap wire of copper. A small segment of copper wire is bonded to the center of the foil to minimize any transverse temperature gradients resulting from any conduction along the center tap wire. A multi-unit calorimeter can be achieved by soldering the foil center tap wire from one unit to the base of an adjoining unit resulting in a circuit containing a plurality of copper/constantan/copper differential thermocouples in series. The basis of the individual units are electrically insulated from each other and a single thermocouple is used to measure the base temperature of the calorimeter. The calorimeter can be calibrated and used in the same manner as calorimeters used in the past.

It is therefore an object of the invention to provide a calorimeter having a higher signal level under low radiation flux or with a low solar absorptivity.

It is another object to provide a calorimeter having a high degree of linearity minimizing the effect of radial heat conduction.

It is another object to provide a series of calorimeters which have the convenience of a visual inspection and are also easy to construct.

These and other advantages, features and objects of the invention will become more apparent from the following description taken in connection with the illustrative embodiments in the accompanying drawings, wherein:

DESCRIPTION OF THE DRAWINGS

FIG. 1*a* is a top view of a calorimeter used in the prior art;

FIG. 1*b* is an elevation view of that shown in FIG. 1*a*;

FIG. 2*a* is a top view of a calorimeter which is an embodiment of this invention;

FIG. 2*b* is an elevation view of that shown in FIG. 2*a*;

DETAILED DESCRIPTION OF THE PREFERRED EMBODIMENTS

Figure 3A:
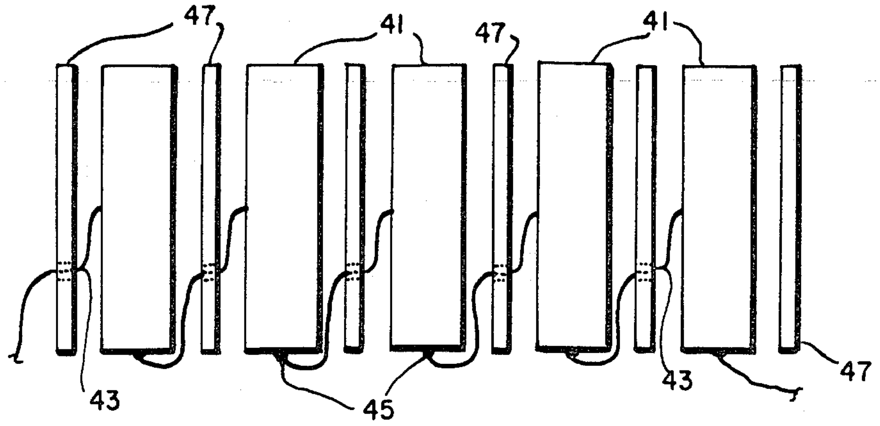
FIG. 3*a* is an exploded top view of a five-unit calorimeter.

A typical commercial calorimeter 10 is shown in FIGS. 1*a* and 1*b*. Calorimeter body 11 is copper, the sensing surface 13 is a constantan foil, and the center tap wire 15 is copper. This results in a copper/constantan/copper differential thermocouple and is connected at point 17 to sensing surface 13. A separate thermocouple 19 together with base wire 21 of the differential thermocouple measures the calorimeter base temperature. The absorbed radiation flux is given by:

$$\dot{q}_a = V/S + o\, T_B^4$$

where:

$V$ = differential thermocouple output, millivolts $S$ = calorimeter sensitivity, millivolt-hour-ft$^2$/Btu $\sigma$ = Stefan-Boltzman constant, Btu/hr ft$^2 o_R$ $\epsilon$ = emissivity of calorimeter sensing surface, dimensionless $T_B$ = calorimeter base temperature, $o_R$. In order to have a useable output signal from the differential thermocouple circuit under conditions of low absorbed radiation flux, it is necessary to reduce the constantan foil thickness to a minimum. This can result in a paint coating thickness several times the thickness of the foil. This, coupled with the radial conduction path resulting from the circular construction, is the probable cause of the nonlinearity that was exhibited by the calorimeter units used in the past. These units have a different sensitivity, S, when calibrated under low radiation flux levels than when calibrated at solar constant levels.

An individual unit of the improved calorimeter 25 is shown in FIGS. 2*a* and 2*b*. Base 27 is copper; sensing surface foil 29 is constantan; and the sensing surface tap wire 31 is copper and is connected to constantan foil 29 at point 33. A small segment of copper wire 35 is bonded to the center of constantan foil 29 to minimize any transverse temperature gradients resulting from any conduction along the center tap wire 31. Thermocouple 37 and base wire 39 measure the temperature of the base.

Figure 3B:
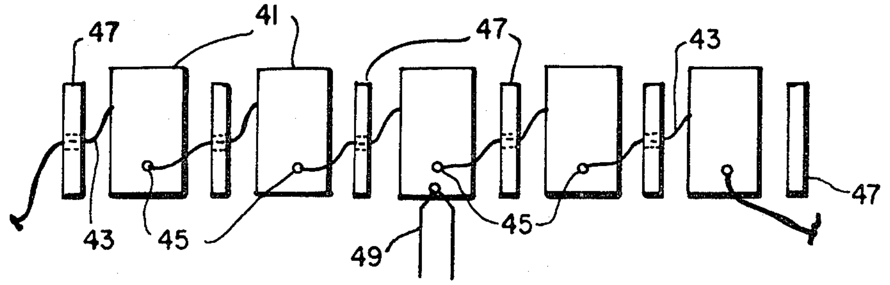
FIG. 3*b* is an exploded elevation view of that shown in FIG. 3*a*.

FIGS. 3a and 3b show an exploded view of a five-unit calorimeter having five units 41. The foil center tap wire 43 from one unit is soldered to the base 45 of the adjoining unit, resulting in a circuit containing five copper/constantan/copper differential thermocouples in series. The bases of the individual units 41 are electrically insulated from each other by isolators 47. A single thermocouple 49 is used to measure the base temperature of the calorimeter.

What is claimed is:

1. A calorimeter comprising:

a. a series of units, each unit including 1. a housing in the shape of a rectangular solid and having a copper base and side members,
   2. an upper sensing surface of constantant foil supported by the housing and having a rectangular configuration for eliminating radiating thermal gradients,
   3. a center tap copper wire attached to the constantan foil upper sensing surface,
   4. a second copper wire attached to the base, and
   5. a segment of copper bonded to the center of the constantan foil upper sensing surface for minimizing transverse temperature gradients;

b. a series of isolators interposed between the bases, each isolator being connected to the center tap copper wire and the second copper wire of an adjacent unit, and c. a single thermocouple attached to the base of one of the units of the series.

* * * * *